United States Patent Office 3,121,781
Patented Feb. 18, 1964

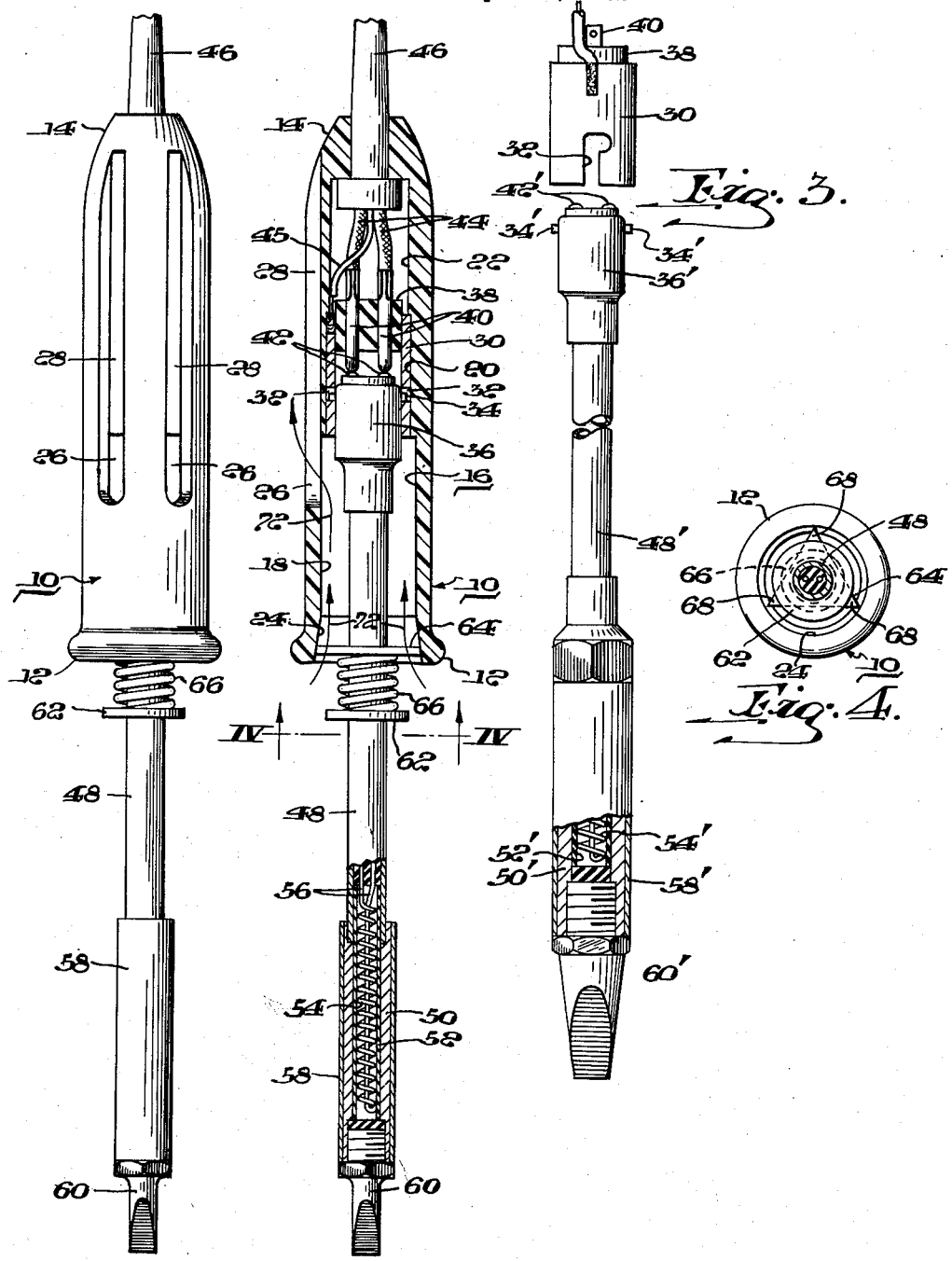

3,121,781
ELECTRIC HEATED SOLDERING IRON
Alexander Schoenwald, Grove City, Pa., assignor to
P. Wall Manufacturing Company, Grove City, Pa., a
corporation of Pennsylvania
Filed Apr. 5, 1962, Ser. No. 185,259
8 Claims. (Cl. 219—26)

This invention relates to an improved soldering iron incorporating novel means for carrying heat away from its handle, and more particularly to a soldering iron of the type described adapted to employ interchangeable heating elements as well as interchangeable soldering tips.

As is known, the usual soldering iron is sold with a more or less integral heating element which cannot be readily disconnected from the handle of the iron. Consequently if it is desired to use a different type or size of iron, one complete unit must be substituted for another. This not ony creates an inventory problem, but also results in attempts to use the wrong iron for a particular application.

Accordingly, as an overall object, and in accordance with one aspect thereof, the present invention provides a soldering iron comprising a handle having an electrical socket interiorly thereof adapted to receive different-size barrels, each of which is provided with a heating element and a different-size soldering tip. In this manner, a single handle, which is probably the largest part of the soldering iron, can be equipped with a plurality of different-sized soldering units, each of which is intended for use in a different application.

Another object of the invention is to provide means for effectively cooling the handle of a soldering iron. As is known, it has always been a problem attempting to prevent excessive heating of a soldering iron handle, particularly when it is used for hours at a time. Usually, the barrel containing the heating element is connected to the forward end or bottom of the handle in such a manner that a minimum amount of contact exists between the handle and the barrel. Additionally, means are usually provided for radiating heat away from the barrel.

When it is desired to provide a soldering iron with detachable barrels, the electrical socket to which the detachable barrels are connected is best provided at the top of a hollow handle, within the interior thereof. This necessitates a barrel which extends through the center of the handle, and since heat will be readily conveyed from the tip to the barrel, some means must be provided to prevent this heat from being transmitted to the handle which would otherwise result in an excessively hot condition.

Accordingly, in accordance with another aspect of the invention, the handle is provided with a plurality of radially-extending openings therein which will permit convection currents to carry heat away from the barrel and prevent overheating of the handle. Preferably, the outer periphery of the handle is provided with axially-extending slots which communicate with the radial slots such that the heat can be removed from the handle by convection currents, notwithstanding the fact that the handle is grasped by the hand of a user.

Another object of the invention is to provide means for laterally supporting a soldering iron barrel which extends through the open lower end of a hollow handle and is connected to an electrical socket at the upper end of the handle. As will be understood, in order to provide cooling of the handle by the use of convection currents, the lower end of the handle must be at least partially open, but at the same time means must be provided to give lateral support to the barrel aside from that given by the electrical connection at the top of the handle. Accordingly, the present invention provides novel means for giving such lateral support, which means additionally provides a device for preventing disengagement of the barrel from its connection to the electrical socket at the top of the handle. Preferably, the socket within the handle is of the female double contact bayonet type which receives a cooperating male bayonet socket. This provides for a positive electrical connection and mechanical fixed position of the barrel at its upper end. Additionally, the means for providing lateral support for the barrel comprises a collar secured to the barrel intermediate its ends, a triangularly-shaped member which is adapted to fit into and engage a conical inner peripheral surface at the bottom of the handle, and spring means interposed between the triangularly-shaped member and the collar. In this way, the spring will provide a means for preventing dislodgment of the male and female portions of the bayonet socket due to vibrational or other effects.

Still another object of the invention is to provide a soldering iron tip arrangement which allows for exceptionally good heat transfer characteristics between the heating element and the tip itself. As will be seen, this is afforded by providing an over-dimensioned copper heatsink within which the heating element is built, together with a copper soldering tip which is connected to the heatsink so as to provide a maximum area of contact between the heat-sink and tip.

The above and other objects and features of the invention will become apparent from the following detailed description taken in connection with the accompanying drawings which form a part of this specification, and in which:

FIGURE 1 is an elevational or side view of the soldering iron of the present invention;

FIG. 2 is a partially broken-away cross-sectional view of the soldering iron of FIG. 1;

FIG. 3 is a partially broken-away elevational view of a soldering iron barrel assembly adapted to be substituted for the barrel assembly shown in FIGS. 1 and 2; and FIG. 4 is a cross-sectional view taken along line IV—IV of FIG. 2 showing the arrangement for laterally supporting the soldering iron barrel of the present invention.

Referring now to the drawings, and particularly to FIGS. 1 and 2, the soldering iron shown includes a handle of insulating material 10, such as plastic or nylon, having an annular flange 12 formed integrally on its lower end and a tapered upper end 14. As best shown in FIG. 2, the handle 10 is hollow, and in this respect is provided with an inner axially-extending cavity 16 having a lower portion 18 of greatest diameter, an intermediate portion 20 of smaller diameter, and an upper portion 22 of still smaller diameter. The lower end of the cavity 16 is flared outwardly to provide a generally truncated conical surface 24.

Provided in the sides of the hollow handle 10 are radially-extending holes or openings 26, and communicating with the holes 26 are axially-extending slots 28 which extend from the openings 26 to the upper tapered end 14 of the handle. As will hereinafter be seen, this enables convection currents to flow from the interior of the cavity 16 through the openings 26 and along the axial slots 28 to the upper end 14, notwithstanding the fact that the openings 26 may be covered by the hand of a user.

Press fitted into the intermediate portion 20 of the cavity is the female portion 30 of a double contact bayonet socket, this portion being shown in plan view in FIG. 3. The female portion 30 is provided with slots 32 adapted to receive pins 34 extending outwardly from the sides of the male portion 36 of the socket. Although a candelabra bayonet socket is shown herein, any type of bayonet socket may be used. In the particular socket shown herein, a slug 38 of insulating material is fitted into the top of the female portion 30, and extending through this slug are two spring-loaded electrical contacts 40. The contacts 40 are adapted to engage cooperating contacts 42 on the male portion 36, the arrangement being such that the pins 34 will be inserted into the slots 32, and the male portion 36 pushed upwardly against the force of the spring-loaded contacts 40 and thereafter rotated into the position shown in FIG. 2 wherein contacts 42 engage the contacts 40. Connected to the contacts 40 are electrical leads 44 which, in turn, are adapted for connection through a cord 46 to a conventional 110-volt alternating current electrical outlet. The bayonet socket provides a convenient means for grounding the soldering iron. That is, a third or ground wire 45 may be readily soldered to the female portion 30, and since this portion contacts the male portion 36 and the remainder of the soldering iron, the entire assembly is grounded to prevent possible injury to a user.

Connected to the lower reduced diameter portion of the male portion of the socket is a soldering iron barrel 48 which, at its lower end, is press fitted onto a tubular copper member 50 (FIG. 2). Provided on the inner periphery of member 50 is a sleeve 52 of heat-resistant insulating material, such as a ceramic; and within the cavity formed by the sleeve 52 is an electrical heating coil 54 connected through leads 56 to the contacts 42 on the male portion 36 of the electrical socket, the arrangement being such that when the portion 36 is inserted into portion 30 and rotated into the position shown in FIG. 2, the coil 54 may be connected to a source of electrical current through leads 44. Preferably, the barrel 48 is formed from stainless steel or other similar non-corrosive material. Surrounding the tubular copper member 50 is a stainless steel sleeve 58, and threaded into the bottom of the copper tubular member 50 is a copper soldering tip 60. It will be appreciated that the tip 60 is threaded into the tubular member 50 a considerable distance. Furthermore, the width of the member 50 around the threads on the tip 60 is such that an exceptionally good heat-sink for latent heat storage is provided together with an exceptionally good heat conducting path between the tip and the sink. Furthermore, by virtue of the fact that the tubular member 50 and the tip 60 are formed from the same material, namely copper, both will expand and contract at the same rate, thereby eliminating "freezing-in." The heating coil 54 is preferably over-dimensioned relative to the generated B.t.u.'s and temperature, and in addition to this, the heat-sink comprising member 50 has a high heat and radiation capacity which will prevent dangerous hot spots on the heating element which would otherwise reduce the life of the tool.

Clamped or otherwise secured to the barrel 48 intermediate its ends is a collar 62. Slideably received on the barrel above the collar 62 is a triangularly-shaped plate 64; and between the coller 62 and plate 64 is a coil spring 66. The triangular plate 64 is best shown in FIG. 4, and it will be noted that its vertices 68 engage the truncated conical surface 24 on the lower inner periphery of the cavity 16.

The assembly of elements 62, 64 and 66 serves two purposes. First, it provides a means for preventing accidental dislodgment of the socket elements 30 and 36 due to vibrational or other forces. That is, the compressional force provided by the contacts 40 will not ordinarily be great enough to prevent disengagement of the socket elements 30 and 36 under all conditions of use, particularly if the barrel 48 is accidentally twisted for one reason or another. The collar 62 is located on the barrel 48 and the spring 66 is of such length that the vertices 68 of the triangularly-shaped plate 64 will be forced into snug, abutting relationship with the truncated conical surface 24, thereby exerting a downward force on the barrel 48 tending to prevent it from being accidentally rotated so as to separate the socket elements 30 and 36.

Second, the assembly of elements 62, 64 and 66 provides lateral support for the barrel 48 within cavity 16. That is, aside from the triangular plate 64, the only support for the barrel 48 is within the socket 30, meaning that if the member 64 were not present, the barrel would be supported within socket 30 in cantilever beam relationship with the result that the socket 30 would probably become weakened after continued use.

As was mentioned above, it is a feature of the present invention that the barrel 48 could be replaced by a different barrel intended for use in other applications. In order to remove the barrel 48 from socket 30 as shown in FIG. 2, it can simply be forced upwardly against the force of spring 66 and the spring-loaded contacts 40 and rotated, whereupon the pins 34 will slide out of the slots 32. To insert a new barrel into socket 30, the foregoing procedure is reversed, whereupon the barrel is forced upwardly into the socket 30 against the force of spring 66 and the spring-loaded contacts 40 and rotated into a position where it is locked within the socket and contacts 42 make with contacts 40.

Another type of barrel which may be inserted into the socket 30 to replace barrel 48 is shown in FIG. 3 wherein elements which correspond to those shown in FIG. 2 are indicated by like primed reference numerals. Thus, the barrel 48' of FIG. 3 is larger than that of FIG. 2 as are the other elements of the barrel assembly. The general overall configuration of the barrel of FIG. 3, however, is the same as that of FIG. 2. Thus, any size or shape of barrel may be inserted into the socket 30 to suit a particular application. Furthermore, any one of a number of different types of tips may be substituted for the tip 60 or 60' as shown herein.

Since the barrel 48 extends upwardly into the cavity 16 formed in handle 10, and since a considerable amount of heat will travel by conduction from the heating coil 54 to the upper part of the barrel, some means must be provided for conducting the heat at the upper part of the barrel away from the handle. Otherwise, the handle will become excessively hot, particularly when the soldering iron is used for long periods of time. Accordingly, the radial holes or openings 26 provide a means whereby convection currents, generally indicated by the arrows 72 in FIG. 2, may enter through the open bottom end of the handle 10 past the plate 64 and upwardly through the openings 26. Furthermore, if the handle is grasped by the hand of a user and the openings 26 are covered, the convection currents will flow along the axial slots 28 and out to the surrounding air at the tapered end 14 of the handle. With this arrangement, the relative coolness of the handle will always be very near to ambient temperature so that the operator in most circumstances will not be able to notice by holding the tool in his hand whether the tool is working or disconnected.

The present invention thus provides a new and improved soldering iron assembly which provides a means whereby soldering iron barrel assemblies may be replaced one for the other, and at the same time provides for exceptionally good cooling of the handle. In view of the outstanding simplicity of the handle, one unseparable unit is provided which avoids cumbersome assembly procedures and allows simpler inventory requirements.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A soldering iron comprising a handle of hollow form having an open lower end, a generally tubular barrel having its upper end connected to the interior of the hollow handle adjacent the upper end thereof, a heating element and a soldering tip at the lower end of said barrel, said barrel having a cross-sectional area less than the cross-sectional area of the cavity formed in said hollow handle, radially-extending openings in said handle to permit heat to be radiated away from the barrel by convection currents flowing through said openings, and axially-extending slots formed in the outer surface of said handle and communicating with said openings, said slots extending from the openings to one end of the handle whereby the slots will permit air to flow from the interior of the handle and through said openings and the slots notwithstanding the fact that the handle is grasped by the hand of a user.

2. A soldering iron comprising a handle of hollow form having an open lower end, one element of a bayonet electrical connector carried at the top of the handle within the interior thereof, a generally tubular barrel having the other element of the bayonet electrical connector at its top end fitted into said one element, a heating element and a soldering tip at the lower end of the barrel, one of the connector elements being a female element and the other being a male element adapted to fit into the female element, means on said connector elements for preventing separation of the two when the male element is fitted into the female element and one element is thereafter rotated relative to the other along the axis of the soldering iron, an annular collar surrounding the barrel and connected thereto intermediate the ends of the barrel, a member slideably received on said barrel between said other element of the electrical connector and said collar, said member being of a size such that it cannot be forced into the interior of the hollow handle beyond the lower end thereof, and spring means interposed between the collar and said member, the location of said collar and the length of said spring means being such that it will force said member into engagement with the lower end of the handle to provide an axial downward force on said other element of the bayonet electrical connector when the male and female elements of the connector are fitted together and one element is rotated relative to the other along the axis of the soldering iron.

3. A soldering iron comprising a handle of hollow form having an open lower end, one element of a bayonet electrical connector carried at the top of the handle within the interior thereof, a generally tubular barrel having the other element of the bayonet electrical connector at its top end fitted into said one element, a heating element and a soldering tip at the lower end of the barrel, one of the connector elements being a generally cup-shaped female element and the other being a generally cylindrical male element adapted to fit into the female element, at least one pin extending radially outwardly from the side of said male element, at least one slot in the side of said female element adapted to receive the pin on the male element, said slot having an axially-extending portion in which the pin on the male element slides as the male element is inserted into the female element, said slot also having a circumferentially-extending portion which receives the pin when the male element is fully inserted into the female element and rotated relative thereto, an annular collar surrounding the barrel and connected thereto intermediate the ends of the barrel, a member slideably received on said barrel between said other element of the electrical connector and said collar, said member being of a size such that it cannot be forced a substantial distance into the interior of the hollow handle, and spring means interposed between the collar and said member, the location of said collar and the length of the spring means being such that it will force said member into engagement with the lower end of the handle when said pin is in the circumferentially-extending portion of the slot in the female portion, thereby exerting an axial downward force on the barrel which impedes movement of the pin out of said circumferentially-extending portion.

4. A soldering iron comprising a handle of hollow form having an open lower end, the inner periphery of said open lower end being flared outwardly to provide a generally conical configuration, one element of a bayonet electrical connector carried at the top of the handle within the interior thereof, a generally tubular barrel having the other element of the bayonet electrical connector at its upper end fitted into said one element, means on said elements of the bayonet electrical connector for preventing separation of the two when the one element is inserted into the other, a heating element and a soldering tip at the lower end of the barrel, means forming an annular shoulder around the barrel intermediate the ends of the barrel, a member slideably received on said barrel between said other element of the electrical connector and said shoulder, said member being of a size to fit into and become lodged within the conical lower end of said handle, and spring means interposed betwen the shoulder and said member, the location of said shoulder and the length of the spring means being such that it will force said member into engagement with the conical flared portion of the inner periphery of the lower open end of the handle when the one connector element is inserted into the other and the elements are locked together.

5. The soldering iron of claim 4 wherein said member comprises a flat element of triangular shape having an opening extending therethrough perpendicular to its flat faces for receiving said barrel, the vertices of the triangularly shaped element being adapted to engage the conical lower portion of the inner periphery of said handle.

6. A soldering iron comprising a handle of hollow form having an open lower end, the inner periphery of said lower end being flared outwardly to provide a generally conical surface, a generally tubular barrel having its top end connected to the top of the handle within the interior thereof, a heating element and a soldering tip at the other end of the barrel, said barrel having a cross-sectional area within the handle less than the cross-sectional area of the cavity formed in the hollow handle, means defining a generally annular shoulder around the barrel intermediate the ends of the barrel, a member slideably received on said barrel between the top of the barrel and said shoulder, said member being of a size such that it will seat on said conical surface when forced into engagement therewith but will not pass into the interior of the hollow handle beyond the conical surface, and spring means interposed between the shoulder and said member, the location of said shoulder and the length of the spring means being such that it will force said member into engagement with the conical portion on the inner periphery of the handle at the lower end thereof to provide lateral support for the barrel.

7. A soldering iron comprising a handle of hollow form having an open lower end, the inner periphery of said open lower end being flared outwardly to provide a generally conical configuration, the female element of a bayonet electrical connector carried at the top of the handle within the interior thereof, a generally tubular barrel having the male element of the bayonet electrical connector at its upper end fitted into said female element, a heating element and a soldering tip at the lower end of the barrel, said female connector element being generally cup-shaped and said male element being generally cylindrical and adapted to fit into the female element, at least one pin extending radially outwardly from the side of said male element, at least one slot in the side of the female element adapted to receive the pin on the male element, said slot having an axially-extending portion in which the pin on the male element slides as the male element is inserted into the female element, said slot also having a circumferentially-extending portion which receives the pin when the male element is fully inserted into the female element and rotated relative thereto, an annular collar surrounding the barrel and connected thereto intermediate the ends of the barrel, a member slideably received on said barrel between said other element of the electrical connector and said collar, said member being of a size to fit into and become lodged within the conical lower end of said handle, and spring means interposed between the collar and said member, the location of said collar and the length of the spring means being such that it will force said member into engagement with the conical flared portion of the inner periphery of the lower open end of the handle when the pin on said male element is in the circumferentially-extending portion of the slot in the female element to thereby prevent the pin from being dislodged from the circumferentially-extending portion while providing lateral support for the barrel.

8. A soldering iron comprising a handle of hollow form having an open lower end, one element of an electrical connector carried at the top of the handle within the interior thereof, a generally tubular barrel having the other element of the electrical connector at its top end secured to said one element, means on said connector elements for preventing separation of the two under the effect of a force applied along the axis of the soldering iron, a heating element and a soldering tip at the lower end of the barrel, means forming an annular shoulder around the barrel intermediate the ends of the barrel, a member slideably received on said barrel between said other element of the electrical connector and said shoulder, an enlarged inner peripheral portion at the lower end of said handle adapted to receive said member slideably received on said barrel, the size of said member being such that it cannot pass into the interior of the handle beyond said enlarged inner peripheral portion, and spring means interposed between the shoulder and said member, the location of said shoulder and the length of the spring means being such that it will force said member into the enlarged inner peripheral portion at the lower end of said handle when the one connector element is inserted into the other and the two are locked together to thereby provide lateral support for said barrel.

References Cited in the file of this patent
UNITED STATES PATENTS

| | | |
|---|---|---|
| 1,026,269 | Knauff | May 14, 1912 |
| 1,137,295 | Stearns | Apr. 27, 1915 |
| 1,572,666 | Marsden | Feb. 6, 1926 |
| 1,727,986 | Jones | Sept. 10, 1929 |
| 1,749,396 | Schylander | Mar. 4, 1930 |
| 1,961,496 | Holmes | June 5, 1934 |
| 1,985,492 | Frohumuth et al. | Dec. 25, 1934 |
| 2,179,818 | Hampton et al. | Nov. 14, 1939 |
| 2,454,576 | Slack | Nov. 23, 1948 |
| 2,667,561 | Schoenwald | Jan. 26, 1954 |
| 3,023,295 | Johnson | Feb. 27, 1962 |
| 3,048,687 | Knowles | Aug. 7, 1962 |

FOREIGN PATENTS

| | | |
|---|---|---|
| 633,020 | Great Britain | Dec. 5, 1949 |